United States Patent
Hsu et al.

(10) Patent No.: US 10,340,552 B1
(45) Date of Patent: Jul. 2, 2019

(54) ELECTROLYTE COMPOSITION AND METAL-ION BATTERY EMPLOYING THE SAME

(71) Applicant: INDUSTRIAL TECHNOLOGY RESEARCH INSTITUTE, Hsinchu (TW)

(72) Inventors: Chun-Tsung Hsu, Tainan (TW); Che-Wei Chang, Taichung (TW); Chih-Hsing Wang, Taipei (TW); Chien-Chih Chiang, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 46 days.

(21) Appl. No.: 15/852,936

(22) Filed: Dec. 22, 2017

(51) Int. Cl.
*H01M 10/0568* (2010.01)
*H01M 10/0585* (2010.01)
(Continued)

(52) U.S. Cl.
CPC ....... *H01M 10/0568* (2013.01); *H01M 4/136* (2013.01); *H01M 4/663* (2013.01);
(Continued)

(58) Field of Classification Search
CPC ........... H01M 10/052; H01M 10/0568; H01M 10/0525; H01M 2300/0025; H01M 10/0567; H01G 11/62
See application file for complete search history.

(56) References Cited

U.S. PATENT DOCUMENTS

| | | | |
|---|---|---|---|
| 4,166,888 | A | 9/1979 | Rao et al. |
| 4,463,071 | A | 7/1984 | Gifford et al. |
| | | (Continued) | |

FOREIGN PATENT DOCUMENTS

| | | |
|---|---|---|
| CN | 1252853 C | 4/2006 |
| CN | 102666935 A | 9/2012 |
| | (Continued) | |

OTHER PUBLICATIONS

Jiao et al., "A rechargeable Al-ion battery: Al/molten $AlCl_3$-urea/graphite," Chem. Commun., vol. 53, Jan. 23, 2017, pp. 2331-2334.
(Continued)

*Primary Examiner* — Stewart A Fraser
(74) *Attorney, Agent, or Firm* — Birch, Stewart, Kolasch & Birch, LLP

(57) ABSTRACT

An electrolyte composition and a metal-ion battery employing the same are provided. The electrolyte composition includes a metal halide, an organic compound, and a halogen-containing salt, wherein the halogen-containing salt has a structure represented by Formula (I)

$[C^{a+}]_i[X^-]_j$   Formula (I)

, wherein M can be IA element, IIA element, IIIA element, IVA element, VA element, VIA element, transition metal, pyrrolium, pyrrolinium, pyrrolidinium, pyridinium, ammonium, imidazolium, indazolium, pyrimidinium, etc.; wherein A can be F, Cl, Br, or I; a=j/i; i is 1, 2, 3, or 4; j is 1, 2, 3, 4, 5, or 6. The molar ratio of the metal halide to the organic compound is higher than 2, and the molar ratio of metal halide to the halogen-containing salt is higher than 2. The metal halide is different from the halogen-containing salt.

20 Claims, 1 Drawing Sheet

(51) Int. Cl.
*H01M 10/054* (2010.01)
*H01M 4/66* (2006.01)
*H01M 4/136* (2010.01)
*H01M 4/02* (2006.01)

(52) U.S. Cl.
CPC ..... *H01M 10/054* (2013.01); *H01M 10/0585* (2013.01); *H01M 2004/027* (2013.01); *H01M 2004/028* (2013.01); *H01M 2300/008* (2013.01); *H01M 2300/0028* (2013.01)

(56) References Cited

U.S. PATENT DOCUMENTS

| | | | |
|---|---|---|---|
| 7,397,651 | B2 | 7/2008 | Takeda et al. |
| 9,882,246 | B2 * | 1/2018 | Matsui .................. H01G 11/22 |
| 10,205,190 | B2 * | 2/2019 | Lee ....................... H01M 4/382 |
| 2016/0064770 | A1 | 3/2016 | Lee et al. |

FOREIGN PATENT DOCUMENTS

| | | |
|---|---|---|
| CN | 102216499 B | 6/2014 |
| CN | 103956516 A | 7/2014 |
| CN | 104303360 A | 1/2015 |
| CN | 102460796 B | 6/2015 |
| CN | 104078705 B | 3/2016 |
| TW | 201742303 A | 12/2017 |

OTHER PUBLICATIONS

Taiwanese Office Action and Search Report, dated Sep. 11, 2018, for Taiwanese Application No. 106145276.

* cited by examiner

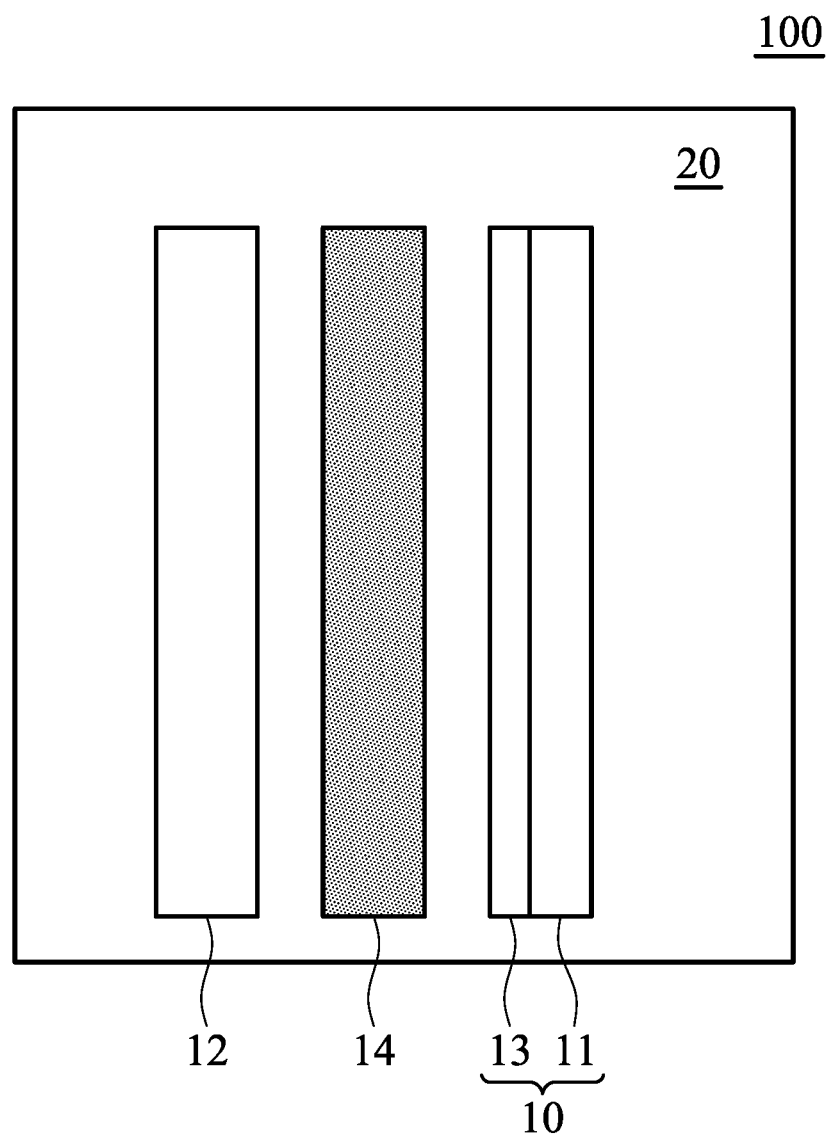

ELECTROLYTE COMPOSITION AND METAL-ION BATTERY EMPLOYING THE SAME

TECHNICAL FIELD

The technical field relates to an electrolyte composition and a metal-ion battery employing the same.

BACKGROUND

Aluminum is the most abundant metal on earth, and electronic devices that are based on aluminum have the advantage of being inexpensive to produce. An aluminum-based redox couple involves in three-electron transfer during electrochemical charge/discharge reactions, and when applied to an energy storage device, it could provide a greater energy storage capacity. Furthermore, aluminum has low flammability and redoxability, meaning that an aluminum-ion battery might offer significant safety improvements.

The electrolyte composition employed in some traditional metal-ion batteries (such as an aluminum-ion battery) may include ionic liquid. For example, some aluminum-ion batteries employ an electrolyte composition including aluminum chloride and imidazolium chloride and exhibit good electrochemical reversibility. Since the imidazolium chloride has a high cost and the ratio of imidazolium chloride to aluminum chloride for forming a eutectic system is strict, the yield of the aluminum-ion battery employing the same is limited.

Therefore, the industry needs a novel electrolyte composition to solve the problems mentioned above.

According to embodiments of the disclosure, the disclosure provides an electrolyte composition and a metal-ion battery employing the same. The electrolyte composition includes a metal halide, an organic compound and a halogen-containing salt. In particular, the organic compound can be nitrogen-containing compound, sulfur-containing compound, or a combination thereof. The halogen-containing salt can have a structure represented by Formula (I):

Formula (I)

, wherein C can be IA element, IIA element, IIIA element, IVA element, VA element, VIA element, transition metal, pyrrolium, pyrrolinium, pyrrolidinium, pyridinium, ammonium, imidazolium, indazolium, pyrimidinium, azaannulenium, azathiazolium, benzimidazolium, benzofuranium, benzotriazolium, borolium, cholinium, cinnolinium, diazabicyclodecenium, diazabicyclononenium, diazabicyclo-undecenium, dithiazolium, furanium, guanidinium, indolinium, indolium, morpholinium, oxaborolium, oxaphospholium, oxazinium, oxazolium, iso-oxazolium, oxathiazolium, pentazolium, phospholium, phosphonium, phthalazinium, piperazinium, piperidinium, pyranium, pyrazinium, pyrazolium, pyridazinium, quinazolinium, quinolinium, iso-quinolinium, quinoxalinium, selenozolium, sulfonium, tetrazolium, iso-thiadiazolium, thiazinium, thiazolium, thiophenium, thiuronium, triazadecenium, triazinium, triazolium, iso-triazolium, or uronium; X can be fluorine, chlorine, bromine, or iodine; a=j/i; i can be 1, 2, 3, or 4; and j can be 1, 2, 3, 4, 5, or 6. The molar ratio of the metal halide to the organic compound can be greater than 2; the molar ratio of the metal halide to the halogen-containing salt can be greater than 2; and, the metal halide is distinct from the halogen-containing salt.

According to embodiments of the disclosure, the disclosure also provides a battery. The metal-ion battery includes a positive electrode, a separator, a negative electrode, and an electrolyte. The negative electrode and the positive electrode are separated from each other by the separator; and, the electrolyte composition is disposed between the positive electrode and the negative electrode.

A detailed description is given in the following embodiments with reference to the accompanying drawings.

BRIEF DESCRIPTION OF THE DRAWINGS

FIG. 1 is a schematic view of the metal-ion battery according to an embodiment of the disclosure.

DETAILED DESCRIPTION

The electrolyte composition and the metal-ion battery of the disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In the drawings, the size, shape, or thickness of some of the elements may be exaggerated and not drawn on scale for illustrative purposes. The will be described with respect to particular embodiments and with reference to certain drawings but the disclosure is not limited thereto.

According to embodiments of the disclosure, electrolyte composition can include a metal halide, an organic compound, and a halogen-containing salt, wherein the metal halide is distinct from the halogen-containing salt. The molar ratio of the metal halide to the organic compound is greater than 2, and the molar ratio of the metal halide to the halogen-containing salt is also greater than 2. The organic compound can be nitrogen-containing compound, sulfur-containing compound, or a combination thereof. The halogen-containing salt has a structure represented by Formula (I):

Formula (I)

, wherein C can be IA element, IIA element, IIIA element, IVA element, VA element, VIA element, transition metal, pyrrolium, pyrrolinium, pyrrolidinium, pyridinium, ammonium, imidazolium, indazolium, pyrimidinium, azaannulenium, azathiazolium, benzimidazolium, benzofuranium, benzotriazolium, borolium, cholinium, cinnolinium, diazabicyclodecenium, diazabicyclononenium, diazabicyclo-undecenium, dithiazolium, furanium, guanidinium, indolinium, indolium, morpholinium, oxaborolium, oxaphospholium, oxazinium, oxazolium, iso-oxazolium, oxathiazolium, pentazolium, phospholium, phosphonium, phthalazinium, piperazinium, piperidinium, pyranium, pyrazinium, pyrazolium, pyridazinium, quinazolinium, quinolinium, iso-quinolinium, quinoxalinium, selenozolium, sulfonium, tetrazolium, iso-thiadiazolium, thiazinium, thiazolium, thiophenium, thiuronium, triazadecenium, triazinium, triazolium, iso-triazolium, or uronium; X can be fluorine, chlorine, bromine, or iodine; a=j/i; i can be 1, 2, 3, or 4; j can be 1, 2, 3, 4, 5, or 6. In detail, the IA element can include Li, Na, K, Rb, and Cs; the IIA element can include Be, Mg, Ca, Sr, Ba, and Ra; the IIIA element can include Al, Ga, In, and Tl; the IVA element can include Si, Ge, Sn, and Pb; the VA can include P, As, Sb, and Bi; the VIA element can include Se, Te, and Po; transition metal can include Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, La series element, and Ac; pyrrolium, for example, can be methylpyrrolium; pyrrolinium, for example, can be methylpyrrolinium; pyrrolidinium, for example, can be methylpyrrolidinium; pyridinium, for example, can be methylpyridinium; ammonium, for example, can be methylammonium; imidazolium, for example, can be methylimidazolium; indazolium, for example, can be methylindazolium; pyrimidinium, for example, can be methylpyrimidinium. For example, the halogen-containing salt having a structure represented by Formula (I) can be sodium chloride (NaCl), magnesium chloride ($MgCl_2$), tin tetrachloride ($SnCl_4$), lead tetrachloride ($PbCl_4$), phosphorus pentafluoride ($PF_5$), phosphorus pentachloride ($PCl_5$), arsenic pentafluoride ($AsF_5$), arsenic pentachloride ($AsCl_5$), selenium hexafluoride ($SeF_6$), trimethylamine hydrochloride, triethylamine hydrochloride, 1-ethyl-3-methylimidazolium chloride, or imidazole hydrochloride.

According to some embodiments of the disclosure, the halogen-containing salt can include trimethylamine hydrochloride, triethylamine hydrochloride, 1-ethyl-3-methylimidazolium chloride, imidazole hydrochloride, or a combination thereof.

According to embodiments of the disclosure, the metal halide can include aluminum chloride, ferric chloride, ferrous chloride, zinc chloride, cupric chloride, cuprous chloride, manganese chloride, chromium chloride, aluminum fluoride, ferric fluoride, ferrous fluoride, zinc fluoride, copper fluoride, cuprous fluoride, manganese fluoride, chromium fluoride, niobium chloride, antimony chloride, or a combination thereof.

According to embodiments of the disclosure, the organic compound can be nitrogen-containing compound, sulfur-containing compound, or a combination thereof. In the nitrogen-containing compound can be, for example, amine compound, imine compound, amide compound, imide compound, urea compound, or a combination thereof. The amine compound can be, for example, methanamine, dimethylamine, trimethylamine, ethanamine, diethylamine, triethylamine, dibutylamine, hexamethylenediamine, 2-methylbutylamine, phenethylamine, pyrrolidine, pyrrole, imidazole, pyridine, pyrimidine, etc.; the imine compound can be, for example, benzophenone imine, 2,2,4,4-tetramethyl-3-pentanone imine, hexamethyleneimine, etc.; the amide compound can be, for example, methanamide, acetamide, N-methylformamide, N-methylacetamide, N,N-dimethylformamide, N,N-dimethylacetamide, acrylamide, sulfamide, cyclophosphamide, etc.; imide compound can be, for example, phthalimide, succinimide, maleimide, etc.; and, the urea compound can be, for example, urea, N-methylurea, N-ethylurea, N,N-dimethylurea, N,N-diethylurea, etc. The sulfur-containing compound can be, for example, sulfone compound, sulfonic acid compound, thiol compound, or a combination thereof. The sulfone compound can be, for example, dimethylsulfone, tetramethylene sulfone, diphenyl sulfoxide, etc.; the sulfonic acid compound can be, for example, sulfonic acid, methanesulfonic acid, benzenesulfonic acid, etc.; and, the thiol compound can be, for example, methanethiol, ethanedithiol, isopropanethiol, etc. According to embodiments of the disclosure, the organic compound is a halogen-free compound.

According to some embodiments of the disclosure, the organic compound can include N-methylurea, N-methylacetamide, methylsulfonylmethane, or a combination thereof.

According to some embodiments of the disclosure, the molar ratio of the metal halide to the organic compound is greater than 2 and less than or equal to 205. For example, the molar ratio of the metal halide to the organic compound can be about 2.05, 2.1, 2.2, 2.3, 10, 100, 200, or 205. When the molar ratio of the metal halide to the organic is too high, the metal halide and the organic compound cannot be mixed to form a eutectic mixture. When the molar ratio of the metal halide to the organic compound is too low, the metal halide and the organic compound also cannot be mixed to form a eutectic mixture. According to some embodiments of the disclosure, the molar ratio of the metal halide to the halogen-containing salt is greater than 2 and less than or equal to 13.7. For example, the molar ratio of the metal halide to the halogen-containing salt can be about 2.05, 2.1, 3.4, 5.1, 5.9, 6.8, 8.2, 10.3, 13.7, etc. When the molar ratio of the metal halide to the halogen-containing salt is too high, the metal halide and the halogen-containing salt cannot be mixed to form a eutectic mixture. When the molar ratio of the metal halide to the halogen-containing salt is too low, the halogen-containing salt cannot be completely dissolved in the eutectic system of the metal halide and the organic compound, resulting in a cloudy electrolyte composition with a degraded ionic conductivity.

It should be noted that prior references indicated that the molar ratio of the aluminum chloride to the imidazolium chloride (or chlorine-containing ionic liquid) should be less than 2 in order to avoid that the battery is rendered inoperable, since the molar ratio of the aluminum chloride to the imidazolium chloride exceeds the range for maintaining a eutectic system of the aluminum chloride and the imidazolium chloride resulting in the precipitation of the aluminum chloride. By means of the combination of the metal halide, the organic compound, and the halogen-containing salt provided by the disclosure, the molar ratio of the metal halide to the halogen-containing salt can be more than 2. As a result, the problem that the range of the molar ratio of the aluminum chloride to the imidazolium chloride, for maintaining the eutectic system of the aluminum chloride and the imidazolium chloride, is too narrow, could be solved. Therefore, the cost of the battery of the disclosure is decreased, and thus the production possibility of the is increased.

According to embodiments of the disclosure, the disclosure also provides a metal-ion battery. FIG. 1 is a schematic view of the metal-ion battery 100 according to an embodiment of the disclosure. The metal-ion battery 100 can include a positive electrode 10, a negative electrode 12, and a separator 14, wherein the separator 14 can be disposed between the positive electrode 10 and the negative electrode 12 to separate the negative electrode 12 and the positive electrode 10 from each other, preventing the positive electrode 10 from coming into direct contact with the negative electrode 12. The metal-ion battery 100 further includes the aforementioned electrolyte composition 20 disposed between the positive electrode and the negative electrode in the battery. Thus, the electrolyte composition 20 comes into contact with the positive electrode 10 and the negative electrode 12. The metal-ion battery can be a rechargeable secondary battery or it can be a primary battery.

According to embodiments of the disclosure, the positive electrode 10 can contain a current collector 11 and an active material 13 which is disposed on the current collector. According to embodiments of the disclosure, the positive electrode 10 can consist of the current collector 11 and the active material 13. According to embodiments of the disclosure, the current collector 11 can be conductive carbon substrate, such as carbon cloth, carbon felt, or carbon paper. The current collector 11 can be a metal material, for example a metal such as aluminum, nickel, copper, etc. In addition, the current collector 11 can be a composite of a carbon material and a metal. For example, the carbon content of the conductive carbon substrate is greater than 65 wt % and the conductive carbon substrate has a sheet resistance from about 1 mΩ·cm$^{-2}$ to 6 mΩ·cm$^{-2}$. The active material 13 can be layered carbon material, vanadium oxide, metal sulfide, or a combination thereof. According to embodiments of the disclosure, the layered carbon is graphite, carbon nanotube, graphene, or a combination thereof.

According to embodiments of the disclosure, the layered carbon material can be intercalated carbon material, such as graphite (including natural graphite, electrographite, pyrolytic graphite, foamed graphite, flake graphite, or expanded graphite), graphene, carbon nanotube, or a combination thereof. The active material 13 can have the porosity in a range from about 0.05 to 0.95, such as from about 0.3 and 0.9. In addition, according to embodiments of the disclosure, the active material 13 can develop directly above the current collector 11 (i.e. there is no other layer between the active layer and the current-collecting layer). Furthermore, the active material 13 can be affixed to the current-collecting layer 11 via an adhesive.

According to embodiments of the disclosure, the separator 14 can be glass fibers, polyethylene (PE), polypropylene (PP), nonwoven fabric, wood fibers, poly(ether sulfones) (PES), ceramic fibers, or a combination thereof.

According to embodiments of the disclosure, the negative electrode 12 can be a metal or an alloy of the metal. According to the embodiments of the disclosure, the metal can be copper, iron, aluminum, zinc, indium, nickel, tin, chromium, yttrium, titanium, manganese, or molybdenum. In addition, the negative electrode 12 can further contain a current collector (not shown), and the metal or the alloy of the metal is disposed on the current collector. According to embodiments of the disclosure, the metal or the alloy of the metal can be disposed directly on the current collector (i.e. there is no other layer between the active layer and the current-collecting layer). Furthermore, the metal or the alloy of the metal can be affixed to the current collector via an adhesive. According to embodiments of the disclosure, the metal can have a reduction potential lower than that of aluminum, thereby solving the problem of the negative electrode corrosion of the metal-ion battery.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity.

Example 1

In an argon-filled glove box, 2.05 mole of aluminum chloride and 1 mole of N-methylurea were mixed at room temperature (about 25° C.) to form a eutectic mixture. Next, 0.3 mole of trimethylamine hydrochloride (($CH_3$)$_3$NH$^+$Cl$^-$) was added into the eutectic mixture. After stirring for 12 hr, an electrolyte composition was obtained.

Next, an aluminum foil (with a thickness of 0.025 mm, manufactured by Alfa Aesar) was cut to obtain an aluminum electrode. Next, the aluminum electrode, a separator (glass filter paper with 2 layers, sold by Whatman with trade No. 934-AH), and a graphite electrode (including an active material disposed on a current-collecting substrate, wherein the current-collecting substrate was carbon fiber paper and the active material was natural graphite) were placed in sequence and sealed within an aluminum plastic pouch. After drying at 80° C. for 2 hr in an oven, the electrolyte composition was injected into the aluminum plastic pouch in an argon-filled glovebox, obtaining Metal-ion battery (1).

Next, Metal-ion battery (1) was subjected to a charge-discharge testing with a current of 50 mAg$^{-1}$ by a MTI battery analyzer (BST8-WA, Richmond), and the results are shown in Table 1.

Example 2

Example 2 was performed in the same manner as Example 1 except that trimethylamine hydrochloride (($CH_3$)$_3$NH$^+$Cl$^-$) was replaced with triethylamine hydrochloride (($C_2H_5$)$_3$NH$^+$Cl$^-$). Thus, the metal-ion battery (2) was obtained. Next, battery (2) was subjected to a charge-discharge testing in the same manner as Example 1, and the results are shown in Table 1.

Comparative Example 1

Comparative Example 1 was performed in the same manner as Example 1 in the absence of trimethylamine hydrochloride (($CH_3$)$_3$NH$^+$Cl$^-$). Thus, the metal-ion battery (3) was obtained. Next, Metal-ion battery (3) was subjected to a charge-discharge testing in the same manner as Example 1, and the results are shown in Table 1.

TABLE 1

| | molar ratio of the metal halide to the organic compound | molar ratio of the metal halide to the halogen-containing salt | maximum discharge capacity (mAh/g) | Coulombic efficiency (%) |
|---|---|---|---|---|
| Example 1 | 2.05 | 6.83 | 81 | 99.9 |
| Example 2 | 2.05 | 6.83 | 80 | 94.4 |
| Comparative Example 1 | 2.05 | — | 57 | 61.9 |

As shown in Table 1, in comparison with the electrolyte composition without halogen-containing salt (disclosed in Comparative Example 1), the electrolyte compositions further including halogen-containing salt (disclosed in Examples 1 and 2) can enhance the maximum discharge capacity and Coulombic efficiency of the metal-ion batteries employing the same.

Example 3

In an argon-filled glovebox, 2.05 mole of aluminum chloride and 1 mole N-methylacetamide were mixed at room temperature (about 25° C.) to form a eutectic mixture. Next, 0.3 mole of 1-ethyl-3-methylimidazolium chloride ([EMIm]Cl) was added the eutectic mixture. After stirring for 12 hr, an electrolyte composition was obtained.

Next, an aluminum foil (with a thickness of 0.025 mm, manufactured by Alfa Aesar) was cut to obtain an aluminum electrode. Next, the aluminum electrode, a separator (glass filter paper with 2 layers, sold by Whatman with trade No. 934-AH), and a graphite electrode (including an active material disposed on a current-collecting substrate, wherein the current-collecting substrate was carbon fiber paper and the active material was natural graphite) were placed in sequence and sealed within an aluminum plastic pouch. After drying at 80° C. for 2 hr in an oven, the electrolyte composition was injected into the aluminum plastic pouch in an argon-filled glovebox, obtaining Metal-ion battery (4).

Next, Metal-ion battery (4) was subjected to a charge-discharge testing with a current of 500 mAg$^{-1}$ by a MTI battery analyzer (BST8-WA, Richmond), and the results are shown in Table 2.

Example 4

Example 4 was performed in the same manner as Example 3 except that 1-ethyl-3-methylimidazolium chloride was replaced with imidazole hydrochloride ($C_3H_4N_2H^+$ $Cl^-$). Thus, the metal-ion battery (5) was obtained. Next, Metal-ion battery (5) was subjected to a charge-discharge testing in the same manner as Example 3, and the results are shown in Table 2.

Comparative Example 2

Comparative Example 2 was performed in the same manner as Example 3 in the absence of 1-ethyl-3-methyl-imidazolium chloride. Thus, the metal-ion battery (6) was obtained. Next, Metal-ion battery (6) was subjected to a charge-discharge testing in the same manner as Example 3, and the results are shown in Table 2.

TABLE 2

| | molar ratio of the metal halide to organic compound | molar ratio of the metal halide to the halogen-containing salt | maximum discharge capacity (mAh/g) | Coulombic efficiency (%) |
|---|---|---|---|---|
| Example 3 | 2.05 | 6.83 | 48 | 33.1 |
| Example 4 | 2.05 | 6.83 | 76 | 94.5 |
| Comparative Example 2 | 2.05 | — | 8 | 11.3 |

As shown in Table 2, in comparison with the electrolyte composition without halogen-containing salt (disclosed in Comparative Example 2), the electrolyte compositions further including alogen-containing salt (disclosed in Examples 3 and 4) can enhance the maximum discharge capacity and Coulombic efficiency of the metal-ion batteries employing the same.

Example 5

Example 5 was performed in the same manner as Example 1 except that the amount of trimethylamine hydrochloride was increased to 1.0 mole. Thus, the metal-ion battery (7) was obtained. Next, Metal-ion battery (7) was subjected to a charge-discharge testing in the same manner as Example 1, and the results are shown in Table 3.

TABLE 3

| | molar ratio of the metal halide to the organic compound | molar ratio of the metal halide to the halogen-containing salt | maximum discharge capacity (mAh/g) | Coulombic efficiency (%) |
|---|---|---|---|---|
| Example 1 | 2.05 | 6.83 | 81 | 99.9 |
| Example 5 | 2.05 | 2.05 | 78 | 96.9 |

Example 6

In an argon-filled glovebox, 2.05 mole of aluminum chloride and 0.01 mole of N-methylurea were mixed at room temperature (about 25° C.) to form a eutectic mixture. Next, 1.0 mole of 1-ethyl-3-methylimidazolium chloride ([EMIm]Cl) was added into the eutectic mixture. After stirring for 12 hr, an electrolyte composition was obtained.

Next, an aluminum foil (with a thickness of 0.025 mm, manufactured by Alfa Aesar) was cut to obtain an aluminum electrode. Next, the aluminum electrode, a separator (glass filter paper with 2 layers, sold by Whatman with trade No. 934-AH), and a graphite electrode (including an active material disposed on a current-collecting substrate, wherein the current-collecting substrate was carbon fiber paper and the active material was natural graphite) were placed in sequence and sealed within an aluminum plastic pouch. After drying at 80° C. for 2 hr in an oven, the electrolyte composition was injected into the aluminum plastic pouch in an argon-filled glovebox, obtaining Metal-ion battery (8).

Next, Metal-ion battery (8) was subjected to a charge-discharge testing with a current of 50 mAg$^{-1}$ by a MTI battery analyzer (BST8-WA, Richmond), and the results are shown in Table 4.

TABLE 4

| | molar ratio of the metal halide to the organic compound | molar ratio of the metal halide to the halogen-containing salt | maximum discharge capacity (mAh/g) | Coulombic efficiency (%) |
|---|---|---|---|---|
| Example 6 | 205 | 2.05 | 64 | 52.6 |

Example 7

In an argon-filled glovebox, 2.05 mole of aluminum chloride and 1 mole of N-methylurea were mixed at room temperature (about 25° C.) to form a eutectic mixture. Next, 0.15 mole of 1-ethyl-3-methylimidazolium chloride ([EMIm]Cl) was added into the eutectic mixture. After stirring for 12 hr, an electrolyte composition was obtained.

Next, an aluminum foil (with a thickness of 0.025 mm, manufactured by Alfa Aesar) was cut to obtain an aluminum electrode. Next, the aluminum electrode, a separator (glass filter paper with 2 layers, sold by Whatman with trade No. 934-AH), and a graphite electrode (including an active material disposed on a current-collecting substrate, wherein the current-collecting substrate was carbon fiber paper and the active material was natural graphite) were placed in sequence and sealed within an aluminum plastic pouch. After drying at 80° C. for 2 hr in an oven, the electrolyte composition was injected into the aluminum plastic pouch in an argon-filled glovebox, obtaining Metal-ion battery (9).

Next, Metal-ion battery (9) was subjected to a charge-discharge testing with a current of 50 mAg$^{-1}$ by a MTI battery analyzer (BST8-WA, Richmond), and the results are shown in Table 5.

TABLE 5

| | molar ratio of the metal halide to the organic compound | molar ratio of the metal halide to the halogen-containing salt | maximum discharge capacity (mAh/g) | Coulombic efficiency (%) |
|---|---|---|---|---|
| Example 7 | 2.05 | 13.67 | 74 | 87.1 |

Comparative Example 3

In an argon-filled glovebox, 2.05 mole of aluminum chloride and 1 mole 1-ethyl-3-methylimidazolium chloride ([EMIm]Cl) were mixed at room temperature (about 25° C.) to obtain a mixture. The mixture was cloudy and not a eutectic mixture. Since the mixture was not a clear homogeneous liquid and could not meet the requirements of electrolyte composition, the mixture of Comparative Example 3 was not injected into an aluminum plastic pouch to perform a charge-discharge testing.

It will be clear that various modifications and variations can be made to the disclosed methods and materials. It is intended that the specification and examples be considered as exemplary only, with the true scope of the disclosure being indicated by the following claims and their equivalents.

What is claimed is:

1. An electrolyte composition, comprising:
a metal halide;
an organic compound, wherein the organic compound is a nitrogen-containing compound, a sulfur-containing compound, or a combination thereof; and
a halogen-containing salt, wherein the halogen-containing salt has a structure represented by Formula (I)

$$[C^{a+}]_i[X^-]_j \quad \text{Formula (I)},$$

wherein C is IA element, IIA element, IIIA element, IVA element, VA element, VIA element, transition metal, pyrrolium, pyrrolinium, pyrrolidinium, pyridinium, ammonium, imidazolium, indazolium, pyrimidinium, azaannulenium, azathiazolium, benzimidazolium, benzofuranium, benzotriazolium, borolium, cholinium, cinnolinium, diazabicyclodecenium, diazabicyclononenium, diazabicyclo-undecenium, dithiazolium, furanium, guanidinium, indolinium, indolium, morpholinium, oxaborolium, oxaphospholium, oxazinium, oxazolium, iso-oxazolium, oxathiazolium, pentazolium, phospholium, phosphonium, phthalazinium, piperazinium, piperidinium, pyranium, pyrazinium, pyrazolium, pyridazinium, quinazolinium, quinolinium, iso-quinolinium, quinoxalinium, selenozolium, sulfonium, tetrazolium, iso-thiadiazolium, thiazinium, thiazolium, thiophenium, thiuronium, triazadecenium, triazinium, triazolium, iso-triazolium, or uronium; X is fluorine, chlorine, bromine, or iodine; a=j/i, i is 1, 2, 3, or 4, and j is 1, 2, 3, 4, 5, or 6, and wherein the molar ratio of the metal halide to the organic compound is greater than 2, and the molar ratio of the metal halide to the halogen-containing salt is greater than 2; and wherein the metal halide is distinct from the halogen-containing salt.

2. The electrolyte composition as claimed in claim 1, wherein the metal halide comprises aluminum chloride, ferric chloride, ferrous chloride, zinc chloride, cupric chloride, cuprous chloride, manganese chloride, chromium chloride, aluminum fluoride, ferric fluoride, ferrous fluoride, zinc fluoride, copper fluoride, cuprous fluoride, manganese fluoride, chromium fluoride, niobium chloride, antimony chloride, or a combination thereof.

3. A metal-ion battery, comprising:
a positive electrode;
a separator;
a negative electrode, wherein the negative electrode and the positive electrode are separated from each other by the separator; and
the electrolyte composition of claim 2 disposed between the positive electrode and the negative electrode.

4. The electrolyte composition as claimed in claim 1, wherein the organic compound is a halogen-free compound.

5. A metal-ion battery, comprising:
a positive electrode;
a separator;
a negative electrode, wherein the negative electrode and the positive electrode are separated from each other by the separator; and
the electrolyte composition of claim 4 disposed between the positive electrode and the negative electrode.

6. The electrolyte composition as claimed in claim 1, wherein the nitrogen-containing compound comprises amine compound, imine compound, amide compound, imide compound, urea compound, or a combination thereof.

7. A metal-ion battery, comprising:
a positive electrode;
a separator;
a negative electrode, wherein the negative electrode and the positive electrode are separated from each other by the separator; and
the electrolyte composition of claim 6 disposed between the positive electrode and the negative electrode.

8. The electrolyte composition as claimed in claim 1, wherein the nitrogen-containing compound comprises methanamine, dimethylamine, trimethylamine, ethanamine, diethylamine, triethylamine, dibutylamine, hexamethylenediamine, 2-methylbutylamine, phenethylamine, pyrrolidine, pyrrole, imidazole, pyridine, pyrimidine, benzophenone imine, 2,2,4,4-tetramethyl-3-pentanone imine, hexamethyleneimine, methanamide, acetamide, N-methylformamide, N-methylacetamide, N,N-dimethylformamide, N,N-dimethylacetamide, acrylamide, sulfamide, cyclophosphamide, phthalimide, succinimide, maleimide, urea, N-methylurea, N-ethylurea, N,N-dimethylurea, N,N-diethylurea, or a combination thereof.

9. The electrolyte composition as claimed in claim 1, wherein the sulfur-containing compound comprises sulfone compound, sulfonic acid compound, thiol compound, or a combination thereof.

10. The electrolyte composition as claimed in claim 1, wherein the sulfur-containing compound comprises dimethylsulfone, tetramethylene sulfone, diphenyl sulfoxide, sulfonic acid, methanesulfonic acid, benzenesulfonic acid, methanethiol, ethanedithiol, isopropanethiol, or a combination thereof.

11. The electrolyte composition as claimed in claim 1, wherein the halogen-containing salt comprises sodium chloride (NaCl), magnesium chloride ($MgCl_2$), tin tetrachloride ($SnCl_4$), lead tetrachloride ($PbCl_4$), phosphorus pentafluoride ($PF_5$), phosphorus pentachloride ($PCl_5$), arsenic pentafluoride ($AsF_5$), arsenic pentachloride ($AsCl_5$), selenium hexafluoride ($SeF_6$), trimethylamine hydrochloride, triethylamine hydrochloride, 1-ethyl-3-methylimidazolium chloride, imidazole hydrochloride, or a combination thereof.

12. The electrolyte composition as claimed in claim 1, wherein the molar ratio of the metal halide to the organic compound is greater than 2 and less than or equal to 205.

13. The electrolyte composition as claimed in claim 1, wherein the molar ratio of the metal halide to the halogen-containing salt is greater than 2 and less than or equal to 13.7.

14. A metal-ion battery, comprising:
a positive electrode;
a separator;
a negative electrode, wherein the negative electrode and the positive electrode are separated from each other by the separator; and
the electrolyte composition of claim 1 disposed between the positive electrode and the negative electrode.

15. The metal-ion battery as claimed in claim 14, wherein the positive electrode consists of a current collector and an active material.

16. The metal-ion battery as claimed in claim 15, wherein the current collector is conductive carbon substrate.

17. The metal-ion battery as claimed in claim 15, wherein the active material is layered carbon material, vanadium oxide, or metal sulfide.

18. The metal-ion battery as claimed in claim 14, wherein the negative electrode comprises a metal or an alloy of the metal, a current collector, or a combination thereof.

19. The metal-ion battery as claimed in claim 18, wherein the metal is copper, iron, aluminum, zinc, indium, nickel, tin, chromium, yttrium, titanium, manganese, or molybdenum.

20. The metal-ion battery as claimed in claim 14, wherein the separator is glass fibers, polyethylene, polypropylene, nonwoven fabric, wood fibers, poly(ether sulfones), ceramic fibers, or a combination thereof.

* * * * *